United States Patent

Holt et al.

[11] 4,330,572
[45] May 18, 1982

[54] METHOD FOR REPAIR OF THIN GLASS COATINGS

[76] Inventors: Robert A. Frosch, Administrator of the National Aeronautics and Space Administration, with respect to an invention of Jack W. Holt, Walnut, Calif.; Donald D. Helman, Buena Park, Calif.; Laurence W. Smiser, Downey, Calif.

[21] Appl. No.: 172,100

[22] Filed: Jul. 25, 1980

[51] Int. Cl.³ .................................. B32B 35/00
[52] U.S. Cl. .................. 427/140; 427/372.2; 427/397.7
[58] Field of Search ............... 427/140, 193, 292, 203, 427/299, 309, DIG. 3, 372.2, 379, 397.7; 156/94, 98; 264/36

[56] References Cited

U.S. PATENT DOCUMENTS

| | | | |
|---|---|---|---|
| 2,826,508 | 3/1958 | Giles | 427/140 |
| 2,955,952 | 10/1960 | Herbst | 427/140 |
| 3,865,774 | 2/1975 | Malone | 264/36 |
| 4,244,721 | 1/1981 | Gupta | 427/309 |

OTHER PUBLICATIONS

Narken, "Ceramic Surface Preparation", IBM Technical Disclosure Bulletin, vol. 16, No. 2, Jul. 1973.

*Primary Examiner*—Norman Morgenstern
*Assistant Examiner*—S. L. Childs
*Attorney, Agent, or Firm*—James O. Harrell; John R. Manning

[57] ABSTRACT

A method of repairing cracks or damaged areas in glass, in particular, glass coatings provided on tile. The method includes removing the damaged area using a high speed diamond burr drilling out a cavity that extends slightly into the base material of the tile. All loose material is then cleaned from the drilled out cavity and the cavity is filled adjacent the upper surface of the coating with a filler material including chopped silica fibers mixed with a binder. The filler material is packed into the cavity and a repair coating is applied by means of a brush or sprayed thereover. The repair includes borosilicate suspended in solution. Heat is applied at approximately 2100° F. for approximately five (5) minutes for curing the coating, causing boron silicide particles of the coating to oxidize forming a very fluid boron-oxide rich glass which reacts with the other frits to form an impervious, highly refractory layer.

3 Claims, 8 Drawing Figures

METHOD FOR REPAIR OF THIN GLASS COATINGS

ORIGIN OF THE INVENTION

The invention described herein was made in performance of work under a NASA contract and is subject to the provisions of Section 305 of the National Aeronautics and Space Act of 1968, Public Law 85-569 (72 Stat. 435,402 U.S.C.P. 2457)

BACKGROUND OF THE INVENTION

Heretofore, space vehicles have been launched from space platforms into outer space and normally no attempt was made to recover the entire space vehicle for subsequent use after it has been returned to earth. One reason for this is that the space vehicle was normally damaged extensively by heat generated as it returned back through the atmosphere. In order to protect astronauts and space capsules forming part of the space vehicle from being injured or damaged by the re-entry heat, ablative coatings have been provided on the space capsule. Normally these ablative coatings were designed for a single re-entry trip. If it were desired to utilize the space capsule again, it would be necessary to remove the remains of the ablative coating from the space capsule and place another one thereon.

In recent developments in the space industry, it has been proposed to utilize a space vehicle which will be launched from earth and after orbiting the earth for a period of time, brought back to earth and landed on a runway. In order to protect the space vehicle from the extensive heat generated upon re-entering the earth's atmosphere, heat protective tiles have been placed on the skin of the space vehicle. The thickness of these tiles varies from approximately one inch up to approximately five inches depending on the particular surface that is to be protected and the exposure that that surface encounters during re-entry into the earth's atmosphere. These tiles are designed for absorbing the heat encountered in a large number of missions. It is anticipated that the space shuttle protected with these reusable tiles can be launched and recovered approximately one hundred times.

The shuttle reusable surface insulation (RSI) is composed of machined lightweight fused silica tiles, coated with a thin ceramic coating. This coating is very fragile and highly susceptible to damage, punctures, dings, chips and cracks. These damaged tiles must be removed and replaced if they cannot be repaired. To remove a tile from the skin of the space vehicle and to replace it with another undamaged tile is a time consuming and expensive procedure. Thus, it is desirable to provide a method of in situ repair of the tiles and it is estimated that 1/10th of the manpower is required to repair a tile in accordance with the present invention as compared to removing a tile and replacing it.

Repair of punctured or cracked thin glass has been relatively unsuccessful due to thermal stresses and has not been considered feasible. Attempts have been made to drill a hole at the base of the crack to prevent further crack propagation, but instances of puncture repair or crack healing are relatively non-existent. The process developed according to the invention is used to repair punctures, dings and chips in thin glass.

The RSI tiles that are to be repaired include a ceramic coating which is a borosilicate, reaction cured glass from 0.010 to 0.020" thick.

SUMMARY OF THE INVENTION

A method in accordance with the present invention for repairing thin glass coatings similar to those used on high temperature insulation tile of the United States space shuttle.

In one particular mode of the invention, the damaged area of the ceramic tile is drilled out, forming a cavity that terminates close to the surface of the lightweight fused silica main body portion of the tile. All loose particles are then removed from the drilled out cavity. The drilled out cavity is then filled flush adjacent the upper surface of the coating with a filler material consisting of pulverized silica fibers, which is packed firmly into the cavity. A repair coating is then either sprayed or brushed over the repaired area and allowed to air dry for approximately five (5) hours. The applied coating is then heated with quartz lamps to a temperature of approximately 2100° F. for about five (5) minutes causing an impervious, highly refractory layer to be produced.

When repairing only the ceramic coating or glass, then it is only necessary to apply the coating material over the damaged area and curing it in the same manner as discussed above which will be discussed in more detail below.

Accordingly, it is an important object of the present invention to provide a method for repairing glass coatings.

Another important object of the present invention is to provide a method and apparatus for in situ repairing glass coatings utilizing relatively inexperienced personnel to produce a repaired surface that is integral with the coating being repaired.

These and other objects and advantages of the invention will become apparent upon reference to the following specification, attendant claims and drawings.

DESCRIPTION OF A PREFERRED EMBODIMENT

While a process according to the subject invention can be utilized for repairing holes in cracks and glass, the following description will be made in reference to repairing a tile block that is presently being utilized on a space re-entry vehicle. Normally, the tile blocks are from 1" to 5" in thickness and include a main body portion formed of fused silica (Li-900) supplied by Lockheed Missile and Space Company of Sunnyvale, Calif., which has a ceramic coating positioned thereon that may vary from 0.010–0.020 inch thickness. It is to be understood, of course, that the process could be used for repairing glass of other thickness. The ceramic coating is very brittle and as a result, dings, cracks, and punctures often occur that have to be rapaired prior to launching or relaunching the space vehicle.

Prior to starting the repair of the tile, a filler material and a coating material is prepared. The filler material includes pulverized fused silica (Li-900). This is chopped silica fibers mixed with a binder into a slurry, centrifuged, dried and sintered. Final weight=9 lbs./cu. ft. This is pulverized and screened through −325 mesh. The filler material is supplied by Lockheed Missile and Space Company of Sunnyvale, Calif.

The material for preparing the filler material may be derived from broken tiles of scrap parts not found to be repairable. Such powdered particles are then heated in a dry atmosphere to dry off the moisture contained in or on them. The resulting material then becomes quite formable and of a powdery consistency.

The coating material includes a slurry of the following formulation:

| Coating Solids | | Supplier |
| --- | --- | --- |
| 92.06% Borosilicate Glass Frit (7.50% nominal $B_2O_3$ Content) −325 Mesh #LAC-42-4561-0100 | (Composition Fusing Temperature 2100°) | Corning Glass Works Corning, New York |
| 5% Borosilicate Glass Frit #7740 −325 Mesh | | Corning Glass Works Corning, New York |
| 0.28% Potassium silico fluoride 99% $K_2SiF_6$ #89-23 | | Alfa Products 152 Andover St. Danver, MA. |
| 2.66 Boron Silicide $SiB_4$ Grade AA Special (High in $B_{14}$) | | Cerac, Inc. Milwaukee, Wis. |
| Coating Liquids | | |
| 14.0% Methocel stock | | |
| 86.0% Ethyl Alcohol | | |

The methocel stock solution is 2% methocel and 98% distilled water.

The above solids are measured into a borundum mill according to the above listed percentages and the liquids are added to make a 50% solid and 50% liquid mixture. The solids and alcohol/methocel mixture is ball milled for three (3) hours. After three (3) hours, the mixture is removed and poured out of the borundum mill. Ethyl alcohol is then added to the slurry to provide a repair coating of 36% solids.

Figure 1:
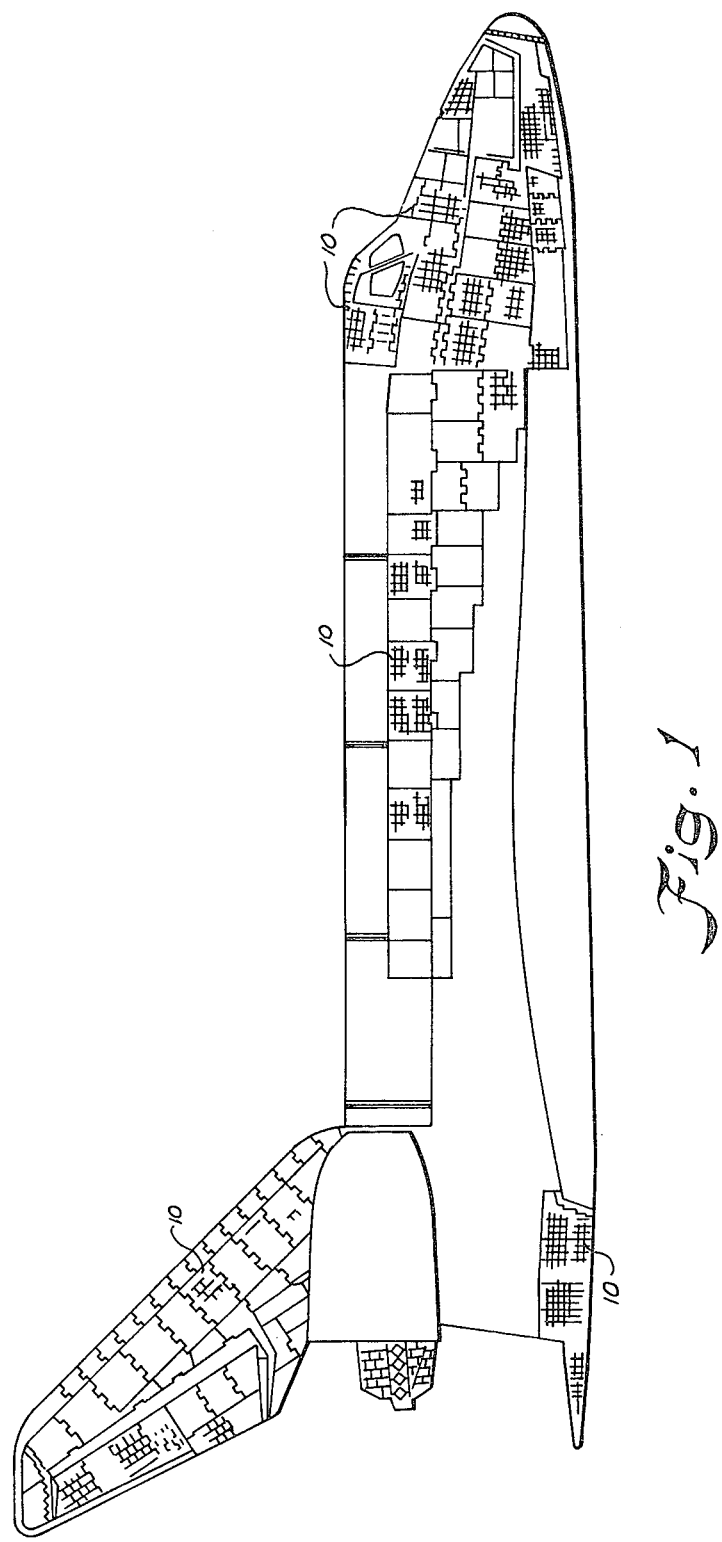
FIG. 1 is a side elevational view of a typical hypersonic space ship/re-entry vehicle showing, diagrammatically, reusable surface insulation in the form of tiles positioned thereon.
Figure 2:
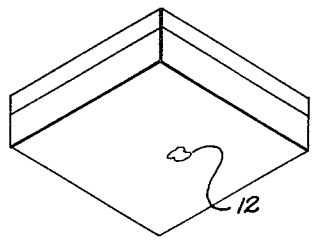
FIG. 2 is an enlarged perspective view of a tile with a coating damaged by a ding.

In FIG. 1, there is illustrated a space re-entry vehicle that is adapted to re-enter the atmosphere after orbiting the earth. The vehicle has tiles 10 positioned on the surface thereof for protecting against extreme heat encountered as the vehicle re-enters the earth's atmosphere. As previously mentioned, these tiles have a very brittle ceramic coating 16 thereon; and if cracks, damages, or punctures occur in the tile, they must be repaired prior to re-use of the vehicle. In order to repair a damaged area 12 such as illustrated in FIG. 2, first the damage is visually checked and if the damaged area is ¼" in diameter or less, the loose coating debris is gently removed using a small spatula or small instrument. Care must be maintained to prevent additional coating damage, and no more tile (Li-900) as identified by the reference character 14 should be removed than is necessary. When the punctured or damaged area is less than ¼", no grinding of the coating should be done unless there is some obvious crack initiators as determined by an alcohol wipe.

Figure 3:
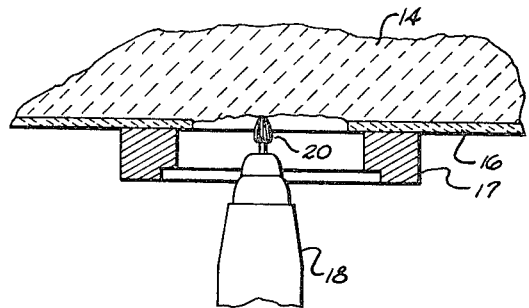
FIG. 3 is a side elevational view showing an operator pulling out the damaged portion of the tile.
Figure 4:
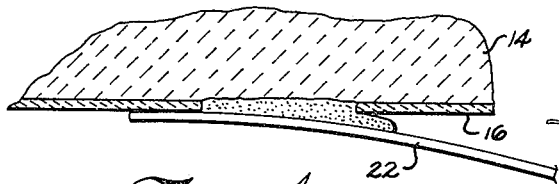
FIG. 4 is a side elevational view showing an operator filling the cavity with a filler material.

When the puncture or damaged area is from ¼" to ¾" in diameter, a circle guide 17 large enough to include the entire damaged area is positioned over the damaged area. A high speed turbine motor 18 with a fine diamond burr 20 is used to trepan a hole in the coating such as illustrated in FIG. 3. It is noted that the burr extends only slightly below the ceramic coating layer 16 into the tile base 14.

When trepaning the hole in the tile coating 16, care should be taken to prevent the diamond burr 20 from going any deeper into the tile material 14 than is necessary to cut through the coating. No more tile should be removed than is absolutely necessary.

After the trepan hole has been ground through the coating 16, the coating debris is gently removed from the damaged area with a spatula or other small instrument and vacuumed. The edge of the coating around the periphery of the damaged area should then be inspected for obvious cracked initiators. If such cracks exist, the high speed turbine motor 18 and fine diamond burr 20 should be used to polish the coating edge in the area to remove these crack initiators.

Figure 5:
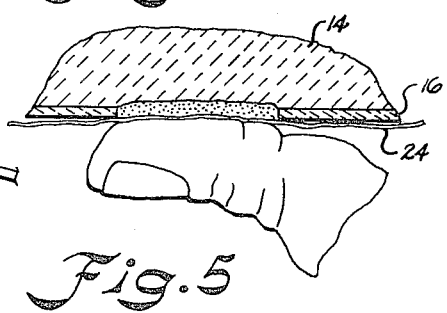
FIG. 5 is a side perspective view illustrating an operator packing the filler material into the cavity using a thin piece of paper placed over the repair cavity and pressing with his thumb.

The next step of the process includes utilizing a spatula or similar instrument 22 for pressing the filler material as described above into the cavity that has been previously drilled out. A weighing paper 24 is then positioned over the repaired area such as illustrated in FIG. 5 and using a thumb to rub over the outer surface of the paper, the filler is packed firmly into the cavity. The filler material is then again added with the spatula and the packing procedure is repeated until the filler surface is smooth and the edge of the coating around the periphery of the damaged area can be barely felt.

The weighing paper 24 is removed and clean cheesecloth is used to wipe the surrounding tile coating for removing any filler material from the surface of the tile. Care must be taken during this procedure not to disturb the filler surface.

Figure 6:
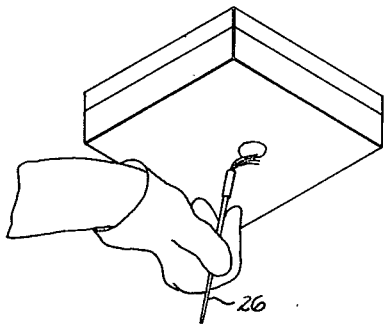
FIG. 6 is a perspective view illustrating a repair coating being brushed onto the repaired area.
Figure 7:
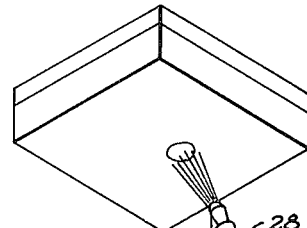
FIG. 7 illustrates a modified means of applying the prepared coating to the repaired area.
Figure 8:
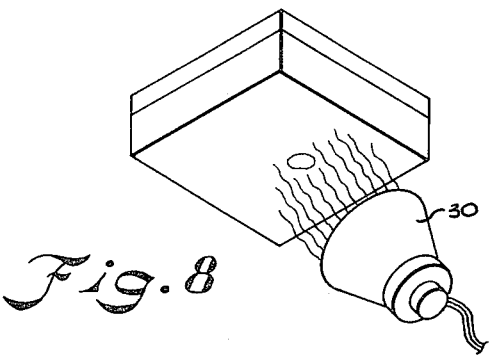
FIG. 8 shows the repaired surface being heated to form integral coating.

There are two methods of applying the repaired coating. The first method is illustrated in FIG. 6 wherein an artist's brush 26 is used for applying the coating over the filled cavity. In FIG. 7, there is illustrated the use of a spray bottle 28 for spraying the repair coating over the filled cavity. When brushing the repair coating such as described above over the damaged area, it should be done in steps until there is a coating buildup of approximately 20 mils. with an overlap over the surrounding coating edge of approximately 3/16". The coating should be allowed to dry between applications only sufficient to keep from dripping or running.

After the desired buildup has been obtained, the repaired area is then allowed to air dry for approximately five (5) hours.

Quartz lamps 30 are then used for curing the repaired area by applying heat of approximately 2100° F. for approximately five (5) minutes. During this firing process, the boron silicide particles oxidize, forming a boron oxidized rich glass. This glass is very fluid and readily wets and reacts with the other frits. In a short time, the reactive liquid consumes enough of the available frit to form an impervious, highly refractory layer.

Tile coatings repaired by the above process have successfully withstood fifteen simulated space shuttle re-entry cycles in vacuum at 2300° F. maximum temperature and twenty-five thermol cycles at atmospheric pressure and the same maximum temperature.

Where there is merely a crack in the ceramic tile surface, alcohol is first applied to the crack. While the crack is still wet with alcohol, the previously described coating material is applied to the crack using a brush. The evaporation of the alcohol helps to draw the coating into the crack, assisting in the capillary action. The brushing on of the coating material is repeated until there is a buildup of approximately 10 mils. The coating material should be allowed to dry between applications only sufficiently to keep from running or dripping.

The excess coating is removed with a clean piece of cheesecloth. The repair coating, when being brushed on, should overlap the crack on each side approximately $\frac{1}{8}''$.

The repaired coating is allowed to air dry for approximately five (5) hours and then cured with heat as described in repairing larger cracks or dings above.

While a preferred embodiment of the invention has been described using specific terms, such description is for illustrative purposes only, and it is to be understood that changes and variations may be made without departing from the spirit or scope of the following claims.

What is claimed is:

1. The method for repairing damaged areas such as punctures or cracks in a ceramic coating provided on lightweight fused silica tiles comprising the following steps:
    (a) drilling out said damaged area in said ceramic coating terminating close to the surface of said lightweight fused silica, producing a cavity;
    (b) cleaning all loose particles from said drilled out cavity;
    (c) filling said drilled out cavity flush with the upper surface of said coating with a filler material prepared by:
        (i) mixing chopped silica fibers with a binder into a slurry, centrifuging, drying and sintering;
        (ii) said sintered filler material then being pulverized and screened through −325 mesh;
    (d) packing said filler material into said cavity;
    (e) applying a coating over said filled cavity, said coating consisting essentially of:
        97 percent borosilicate glass frit
        $B_2O_3$-325 Mesh;
        2.66 percent Boron silicide $SiB_4$; and
        0.28 percent Potassium silicofluoride ($K_2SiF_6$);
    (f) applying heat to said repaired area for curing said coating and filler material;
    said heat being sufficient to cause said Boron silicide to oxidize in a fluid state which consumes enough of said frit to form an impervious, highly refractory layer.

2. The method as set forth in claim 1 further comprising:
    (i) said heat being applied for curing said repaired area being applied by lamps at a temperature of about 2100° F. for about five (5) minutes.

3. The method of repairing damaged areas such as cracks in a glass coating comprising the following steps:
    (a) preparing a slurry including about 92 parts of high fusing temperature borosilicate frit and about 5 parts of lower fusing temperature borosilicate frit, about 2.6 parts of boron silicide, and 0.3 parts potassium silicofluoride in alcohol to yield about a fifty percent (50%) solids mixture by weight;
    (b) applying alcohol to said damaged area;
    (c) while damaged area is still wet from said alcohol, applying said slurry to said damaged area allowing said alcohol to draw said slurry into said damaged area;
    (d) air drying said slurry on said damaged area for about five (5) hours, and
    (e) curing said slurry applied to said repaired area by applying heat at a temperature of 2100° F. for about five minutes causing said boron silicide particles of said slurry to oxidize forming a very fluid boron-oxide rich glass which reacts with the other frits to form an impervious, highly refractory layer.

* * * * *